March 15, 1960   M. H. DAVIS   2,928,286
AUTOMATIC CLUTCH AND TRANSMISSION
Filed April 16, 1956
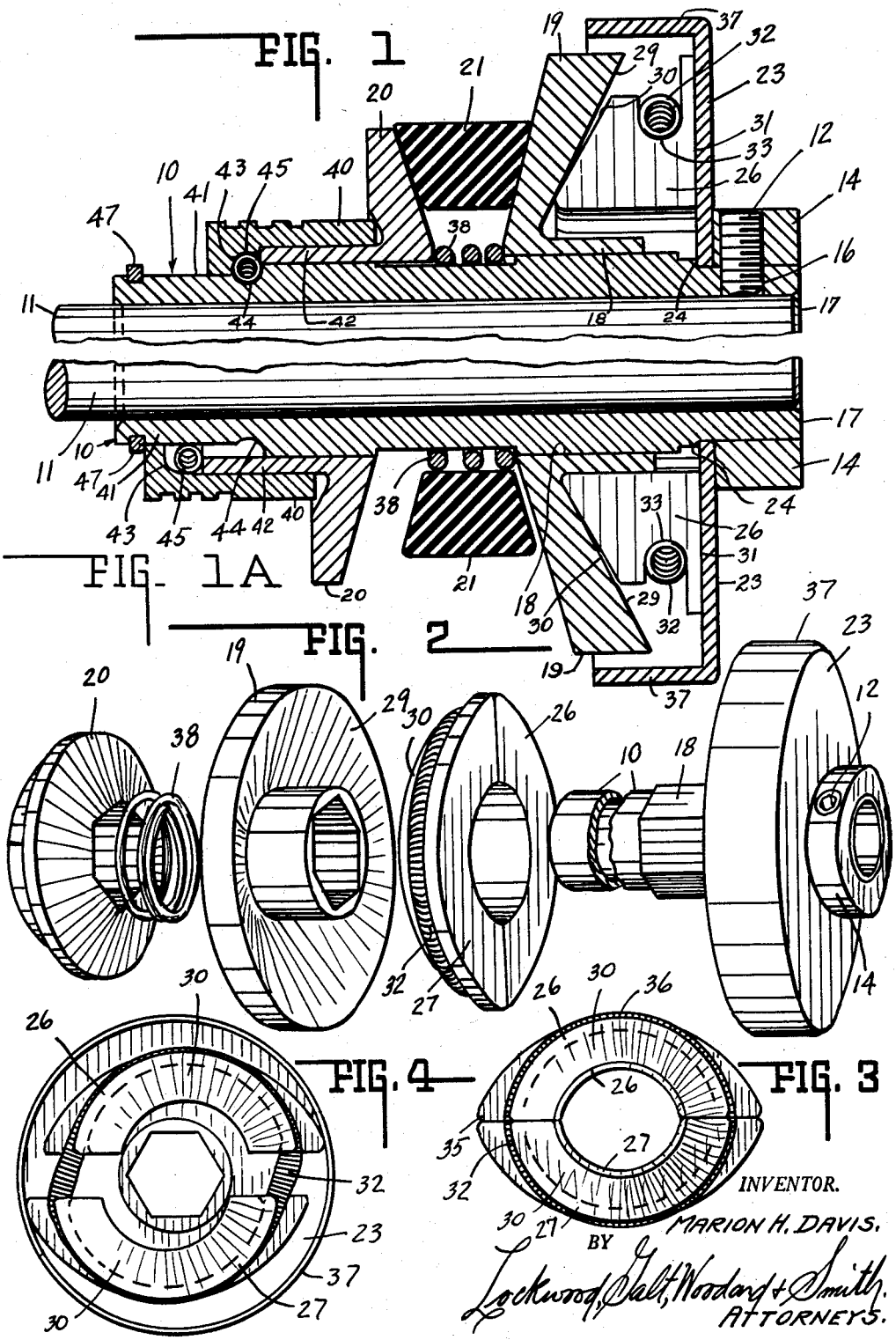
INVENTOR.
MARION H. DAVIS.
BY Lockwood, Galt, Woodard & Smith
ATTORNEYS.

United States Patent Office 2,928,286
Patented Mar. 15, 1960

2,928,286
AUTOMATIC CLUTCH AND TRANSMISSION
Marion H. Davis, Hagerstown, Ind.

Application April 16, 1956, Serial No. 578,397

10 Claims. (Cl. 74—230.17)

This invention relates generally to combined power transmission and clutch devices, and more particularly it relates to an improved power transmission and clutch of the general types shown in my United States Letters Patents Nos. 2,612,054 and 2,623,400.

The power transmission and clutch devices disclosed in my prior patents comprise a pulley assembly adapted to be fixed to the drive shaft of an engine. Individual pulley flanges are movably mounted with respect to one another and operable toward and away from one another by means of a centrifugal governor, thereby to engage and disengage in varying drive ratios with a drive belt. The centrifugal governor mechanism, as disclosed in said patents, comprises annular weights normally held in a low-speed position by means of a coil spring.

In practical use of my patented devices, I have discovered that certain improvements are desirable in order to provide safer and more efficient operation. For example, the governor weights are directly responsive to changes of speed and if an engine is started with the throttle in a high-speed setting, the governor immediately engages the pulley with the belt to transmit power. This can cause personal injury to the operator, particularly when the engine is used to drive power mowers, soil tilling machines, and the like.

It is found that in every day use of this type of mechanism that the governor weights can bind with respect to one another and with respect to the drive shaft, thereby causing faulty operation, such as failure to disengage the pulley sections from the belt when driving speed is decreased.

It has also been found that the governor mechanism disclosed in my prior patents operates with relatively low efficiency at relatively low speeds of operation, principally due to the fact that the shape of the weights and the spring tension exerted on them does not provide positive control of the drive pulley at low speeds. Hence, the load capacity at low speeds is unnecessarily reduced.

The mechanism disclosed in my prior patents is also relatively inefficient because of the fact that the pulley-supporting tube is fully exposed to the belt and the movable pulley flange is keyed to the supporting tube. Since the tube is exposed to the belt, the key cannot project into the path of the belt. Accordingly, the movable portion of the pulley moves almost out of engagement with the key at high operating speeds. At low operating speeds, the belt tends to drag on the supporting tube removing grease therefrom and being subject to excessive wear and deterioration.

The principal object of this invention is to provide an improved transmission and clutch mechanism of the general character of those disclosed in my said prior patents.

Another object of this invention is to provide a clutch and transmission mechanism adapted automatically to transmit power only at predetermined speeds of revolution and including means adapted to prevent transmission of power at high speeds of revolution at the option of the engine operator.

A further object of this invention is to provide an improved governor weight mechanism for transmission and clutch devices which has higher horsepower capacity at relatively lower speeds and which is more accurate and responsive at predetermined clutch engagement and disengagement speeds.

Still another object of this invention is to provide a governor weight mechanism for transmission clutches which provides positive and complete belt release when the clutch is disengaged.

A still further object of this invention is to provide transmission and clutch devices, wherein drag on the belt is reduced to a minimum and contamination with grease is eliminated.

In accordance with this invention, there is provided a combined power transmission and clutch comprising a power coupling sleeve adapted to be fixed to the crank shaft of an engine, a pulley including two frusto conical flange members rotatable with said sleeve and separable with respect to one another for engaging and disengaging the power transmission belt, a fixed cover member on said sleeve in spaced relation to said pulley, elongated governor weights disposed between said cover and said pulley to slide a portion of said pulley along said sleeve in response to speed variation of said sleeve, and means adapted to lock another portion of said pulley in fixed relation to said sleeve to permit said other portion of said pulley to be moved longitudinally of said sleeve out of operation in relation to the first portion of said pulley, thereby to provide manual control of said transmission and clutch.

In accordance with another feature of this invention, the combined transmission and clutch of this invention includes a coil spring member mounted on the power transmitting sleeve between the pulley portions for the purpose of preventing direct contact between the drive belt and the sleeve.

Still another feature of this invention consists in providing governor weights of generally conical configuration, the base portion of which is elongated to have approximately elliptical shape, thereby to prevent jamming of the governor weight when its several portions move away from one another in response to centrifugal force.

The full nature of the invention will be understood from the accompanying drawings and the following description and claims:

Fig. 1 is a partial longitudinal cross section of the combined power transmission and clutch as provided in accordance with this invention, showing the mechanism in driving position;

Fig. 1-A is a partial longitudinal cross section showing the mechanism of Fig. 1 in idling position;

Fig. 2 is an exploded view illustrating in perspective the several parts illustrated in Fig. 1;

Fig. 3 is a full end elevation of the governor weights illustrated in Figs. 1 and 2; and Fig. 4 is a detail view illustrating one possible position of the governor weights.

The combined power transmission and clutch which is provided in accordance with this invention is adapted to be mounted either directly on the crank shaft of an engine or a shaft driven by an engine for transmitting power from the driven shaft in proportion to the speed of the driven shaft. When the engine is driven at idling speeds the combined transmission and clutch automatically adjusts itself to transmit no power, while at increasing speeds the transmission and clutch automatically adjusts itself to engage the belt and vary the pulley diameter in engagement with the belt.

Referring to the drawings, there is provided a power transmission or coupling sleeve 10 which may be mounted directly on the drive shaft 11 of an engine and fixed thereto by means of a set screw 12 threaded within a collar 14. The set screw 12 may project from collar 14 through an aperture 16 in sleeve 10 into engagement with shaft 11.

The sleeve 10 includes a circular end portion 17 which receives the collar 14. There is provided a hexagonal or other polygonal section 18 on which are mounted two slidable cones 19 and 20 for driving a belt 21. The cones 19 and 20 are provided with hexagonal or other polygonal bores conforming to the configuration of section 18 of sleeve 10 so that cones 19 and 20 may slide longitudinally along sleeve 10 and be rotated thereby. In my prior patents a key was provided between cone 19 and sleeve 10 which was limited in length because it could not extend into the space beneath the drive belt. Hence, there was limited drive connection between cone 19 and sleeve 10. The drive connection is unlimited between either of the cones 19 and 20 since the polygonal section 18 is long enough to accommodate both cones.

The governor mechanism is provided for moving cone 19 longitudinally along sleeve 10 in response to varying speeds of shaft 11. A cover 23 is mounted over the circular end portion 17 of sleeve 10 in abutment with a shoulder 24 formed on sleeve 10. Collar 14 serves to clamp cover 23 against shoulder 24 and to provide a driving connection between shaft 11 and sleeve 14. A pair of governor weights 26 and 27 are confined between cover 23 and the concave conical surface 29 of slidable cone 19. The weights 26 and 27 comprise a convex conical surface 30 facing surface 29 of cone 19 and a flat base surface 31 bearing on the inner surface of cover 23. The weights are normally held in abutment with one another by means of a coil spring 32 nested within a groove 33 formed in the outer periphery of weights 26 and 27. It should be noted that the surface 30 of the weights is conical but the outer periphery of the base portion 31 is formed to have a configuration similar to that of an ellipse. Thus, the radius from the axial center of the weights is greater at 35 than at 36 (Fig. 3). The elongation at 35 prevents the ends of the weights from slipping past one another during periods of acceleration and deceleration. For example, Fig. 4 shows the maximum possible displacement of weights 26 and 27 with respect to one another and with respect to sleeve 10.

The governor weights shown in my prior patents have been found to jam either with their end portions embracing and bound against the hub 19a of cone 19 or with the end of one weight jammed between the other weight and the flange 37 of cover 23. This condition cannot occur in the case of weights 26 and 27 because the portion 35 of each weight will engage flange 37 of cover 23 before the end of one weight can slip past the end of the other weight or before the weights can separate and their end portions bind against sleeve 10.

The mid-portion of section 18 of sleeve 10 is provided with a coil bearing member 38 of Phosphor bronze or any other suitable metal which rides freely on sleeve 10 and is free of compression. Thus, the drive belt can bear on bearing 38 when the cones 19 and 20 are completely separated in their non-driving positions. This prevents excessive wear on the belt and removal of grease from sleeve 10 by the belt. Inherently, therefore, bearing 38 prevents grease from deteriorating the drive belt.

In order to provide positive disengagement of cones 19 and 20 with the drive belt, there is provided a collar 40 which rides on the circular end portion 41 of sleeve 10 and which extends over a hub 42 forming a part of cone 20. The collar 40 is partially grooved at 43 and the sleeve 10 is partially grooved at 44 to receive a coiled spring 45. Spring 45 is intended to be under tension when resting in groove 44. On the end of sleeve 10 there is a locking ring 47 which prevents collar 40 from slipping off the sleeve 10. When it is desired to prevent the cone 20 from being in a position to engage with the drive belt at idling or higher speeds, collar 40 may be moved to the left (Figure 1) and cone 20 may be moved to its position illustrated in Fig. 1-A pushing spring 45 out of groove 44. When the motor is started, the drive belt cannot be engaged regardless of engine speed. When it is desired to engage the belt, collar 40 may be pushed into the position shown in the upper half of Fig. 1, thereby moving cone 20 into its operative position. Cone 20 is locked in this position by spring 45 since the spring cannot expand and be disengaged until collar 40 is moved to the left, thereby permitting the spring 45 to stretch and move out of the way of cone 20.

It will be seen from the drawing that the surface of groove 43 extends over the uppermost peripheral point of spring 45 and downwardly to the right to a slight degree so that spring 45 has locking engagement with the overhanging surface of groove 43. This prevents vibration from moving collar 40 to the left. On the other hand, the operator can apply a certain amount of leftward force to collar 40 which will distort spring 45 so that the overhanging surface of groove 43 can be forced free of spring 45. It will be noted that the internal diameter of collar 40 to the right of groove 43 is greater than the internal diameter of groove 43. This greater internal diameter permits the hub 42 to force expansion of spring 45 into the space between end portion 41 and the internal surface of collar 40, thereby permitting movement of cone 20 to the left.

In operation, the automatic transmission and clutch as provided in accordance with this invention may be assumed to be in the condition illustrated in Fig. 1-A at idling speeds of the engine. The governor weights 26 and 27 are pulled into their contracted position by spring 32, thereby allowing cone 19 to assume a position closely adjacent to the convex surface 30 of weights 26 and 27. The collar 40 normally would be positioned by the engine operator to the extreme left in contact with retainer ring 47 and the cone 20 would have been moved to its extreme left position by the engine operator, as shown in Fig. 1-A. Thus, the belt is free of cones 19 and 20 and may rest on the coil bearing member 38 and no power is transmitted by the drive belt.

The engine may then be started to drive shaft 11 and therewith the entire transmission and clutch mechanism. If the engine is running at excessively high speed and the operator grasps the collar 40 to push the cone 20 to the right into a position to engage drive belt 21, he will find that collar 40 becomes extremely hot due to its frictional engagement with the hub portion 42 of cone 20. This will induce the operator to release collar 40 and not attempt to engage the cone 26 with the drive belt. Upon finding that collar 40 becomes excessively hot, the engine operator may then partially close the throttle to slow the engine down to its idling speed. Collar 40 may then be grasped and moved to the right into its position illustrated in Fig. 1 with spring 45 having been moved into the grooves 43, 44. Cone 20 is then positioned in its drive position with respect to the driving belt 21 and is locked in this position because spring 45 is confined by collar 40 and lateral force on cone 20 cannot move this cone back to its idling position.

The engine operator may then speed up the engine by opening the throttle. This increases the centrifugal force on the governor weights 26 and 27, causing them to separate. As separation occurs, the convex surfaces 30 on the governor weights engage the concave surface 29 of cone 19 and as the weights move away from one another, they force cone 19 to move longitudinally of driving sleeve 10 into a position where the belt is engaged by both cones 19 and 20. At relatively low driving speeds, the belt 21 will be in engagement with cones 19 and 20 on a relatively small diameter of these cones. As the speed of the engine is increased, cone 19 will move closer to cone 20 increasing the driving diameter of the cones and, thereby, increasing the driving speed of the belt 21.

The maximum expansion of governor weights 26 and 27 occurs when the portions 35 of these weights contact the inner surface of flange 37 of cover 23. This engagement prevents the weights from becoming jammed with respect to one another either because of the end of one weight slipping past the end of the other weight or because of the adjacent ends of the weights engaging the outer surface of the driving sleeve 10. This could occur in the governor mechanism of my previously granted patent.

When it is desired to break the driving connection between the cones 19, 20 and the driving belt, the engine operator may close the throttle of the engine, decreasing its speed and causing spring 32 to pull the weights 26 and 27 together and out of engagement with cone 19. Cone 19 will then become disengaged from the driving belt and will assume the approximate position illustrated in Fig. 1-A. The driving belt will then engage the coils of bearing 38 but will not engage the driving sleeve 10 and become contaminated with grease.

The invention claimed is:

1. An automatic transmission and clutch for variable speed engines comprising a polygonal power coupling sleeve adapted to be mounted on the crank shaft of an engine, a cover member fixed to said sleeve at one end thereof, a first slidable, belt-driving cone having a bore of similar configuration to that of said sleeve and mounted on said sleeve with the concave side of said cone facing said cover, governor weights confined between said cover and said cone and separable in response to predetermined speed of rotation of said sleeve for positioning said cone in predetermined spaced positions with respect to said cover, a second slidable, belt-driving cone having a bore of similar configuration to that of said sleeve and disposed on said sleeve with the convex side thereof facing the convex side of said first cone, a collar mounted on said sleeve adjacent the concave side of said second cone and movable into contact therewith for positioning said second cone in driving relation to said first cone, and a coil spring embracing said sleeve, said sleeve having a groove for receiving said spring in locking relation to said second cone when moved therein by said collar for holding said second cone in a locked position.

2. An automatic transmission and clutch for variable speed engines comprising a polygonal power coupling sleeve adapted to be mounted on the crank shaft of an engine, a cover member fixed to said sleeve at one end thereof, a first slidable, belt-driving cone having a bore of similar configuration to that of said sleeve and mounted on said sleeve with the concave side of said cone facing said cover, governor weights confined between said cover and said cone and separable in response to predetermined speed of rotation of said sleeve for positioning said cone in predetermined spaced positions with respect to said cover, a second slidable, belt-driving cone having a bore of similar configuration to that of said sleeve and disposed on said sleeve with the convex side thereof facing the convex side of said first cone, a collar mounted on said sleeve adjacent the concave side of said second cone and movable into contact therewith for positioning said second cone in driving relation to said first cone, and a locking device cooperating with said sleeve and said second cone for holding said second cone in a locked position.

3. An automatic transmission and clutch for variable speed engines comprising a polygonal power coupling sleeve adapted to be mounted on the crank shaft of an engine, a cover member fixed to said sleeve at one end thereof, a first slidable, belt-driving cone having a bore of similar configuration to that of said sleeve and mounted on said sleeve with the concave side of said cone facing said cover, governor weights confined between said cover and said cone and separable in response to predetermined speed of rotation of said sleeve for positioning said cone in predetermined spaced positions with respect to said cover, a second slidable, belt-driving cone having a bore of similar configuration to that of said sleeve and disposed on said sleeve with the convex side thereof facing the convex side of said first cone, and a releasable locking mechanism mounted on said sleeve adjacent the concave side of said second cone and movable into contact therewith for positioning said second cone in driving relation to said first cone.

4. An automatic transmission and clutch for variable speed engines comprising a power coupling sleeve adapted to be mounted on the crank shaft of an engine, a cover member fixed to said sleeve at one end thereof, a first, belt-driving cone rotatable with and slidable on said sleeve with the concave side of said cone facing said cover, governor weights confined between said cover and said cone and separable in response to predetermined speed of rotation of said sleeve for positioning said cone in predetermined spaced positions with respect to said cover, and a second, belt-driving cone rotatable with and slidable on said sleeve and disposed on said sleeve with the convex side thereof facing the convex side of said first cone, and a releasable locking mechanism operatively associated with said second cone for positioning said second cone in driving relation to said first cone.

5. An automatic transmission and clutch for variable speed engines comprising a polygonal power coupling sleeve adapted to be mounted on the crank shaft of an engine, a cover member fixed to said sleeve at one end thereof, a first slidable, belt-driving cone having a bore of similar configuration to that of said sleeve and mounted on said sleeve with the concave side of said cone facing said cover, governor weights confined between said cover and said cone and separable in response to predetermined speed of rotation of said sleeve for positioning said cone in predetermined spaced positions with respect to said cover, and a second slidable, belt-driving cone having a bore of similar configuration to that of said sleeve and disposed on said sleeve with the convex side thereof facing the convex side of said first cone.

6. An automatic transmission and clutch for variable speed engines comprising a power coupling sleeve adapted to be mounted on the crank shaft of an engine, a cover member fixed to said sleeve at one end thereof, a first, belt-driving cone rotatable with and slidable on said sleeve with the concave side of said cone facing said cover, governor weights confined between said cover and said cone and separable in response to predetermined speed of rotation of said sleeve for positioning said cone in predetermined spaced positions with respect to said cover, a second, belt-driving cone rotatable with and slidable on said sleeve and disposed on said sleeve with the convex side thereof facing the convex side of said first cone, a collar mounted on said sleeve adjacent the concave side of said second cone and movable into contact therewith for positioning said cone in driving relation to said first cone, and a coil spring embracing said sleeve, said sleeve having a groove for receiving said spring in locking relation to said second cone when moved therein by said collar for holding said second cone in said locked position.

7. An automatic transmission and clutch for variable speed engines comprising a power coupling sleeve adapted to be mounted on the crank shaft of an engine, a cover member fixed to said sleeve at one end thereof and including a cylindrical flange, a first, belt-driving cone rotatable with and slidable on said sleeve with the concave side of said cone facing said cover, a separable weight mechanism confined between said cover and said cone and comprising a pair of semi-circular weights having in combination a convex conical surface mating with the concave side of said cone and an opposed flat surface facing said cover, a coil spring embracing said weights for holding them in a retracted position at low speeds and permitting them to separate at higher speeds into contact with said cone for positioning it in predetermined spaced positions with respect to said cover, the flat surface of said weights having a substantially elliptical configuration to provide extensions engageable with the flange of said cover when the weights assume a position of maximum separation, thereby to prevent jamming of said weights with respect to said sleeve and with respect to one another, and a second belt-driving cone rotatable with said sleeve and disposed on said sleeve with the convex side thereof facing the convex side of said first cone.

8. An automatic transmission and clutch for variable speed engines comprising a power coupling sleeve adapted to be mounted on the crank shaft of an engine, a cover member fixed to said sleeve at one end thereof and including a cylindrical flange, a first, belt-driving cone rotatable with and slidable on said sleeve with the concave side of said cone facing said cover, a separable weight mechanism confined between said cover and said cone and comprising a number of weights having in combination a convex conical surface mating with the concave side of said cone and an opposed flat surface facing said cover, a coil spring embracing said weights for holding them in a retracted position at low speeds and permitting them to separate at higher speeds into contact with said cone for positioning it in predetermined spaced positions with respect to said cover, the flat surface of said weights having extensions engageable with the flange of said cover when the weights assume a position of maximum separation, thereby to prevent jamming of said weights with respect to said sleeve and with respect to one another, and a second belt-driving cone rotatable with said sleeve and disposed on said sleeve with the convex side thereof facing the convex side of said first cone.

9. An automatic transmission and clutch for variable speed engines comprising a power coupling adapted to be connected to the crank shaft of an engine, a cover member fixed to said coupling at one end thereof, a first, belt-driving cone rotatable with and slidable on said coupling with the concave side of said cone facing said cover, a speed responsive mechanism confined between said cover and said cone and comprising a number of weights having in combination a convex conical surface mating with the concave side of said cone and an opposed flat surface facing said cover, the flat surface of said weights including means to prevent jamming of said weights with respect to said coupling and with respect to one another, and a second belt-driving cone rotatable with said coupling and disposed on said coupling with the convex side thereof facing the convex side of said first cone.

10. An automatic transmission and clutch for variable speed engines comprising a power coupling member adapted to be connected to the crank shaft of an engine, a cover member fixed to said coupling member at one end thereof, a pair of belt-driving cones rotatable with said coupling member, a speed responsive mechanism confined between said cover and one of said cones for moving one of said cones to a position free of the belt at low speeds and to a position in contact with said one cone at higher speeds, and a free coiled bearing member on said coupling member between said cones for preventing contact of the belt with the coupling member.

References Cited in the file of this patent
UNITED STATES PATENTS

| | | |
|---|---|---|
| 2,553,505 | Miner | May 15, 1951 |
| 2,599,821 | Friedman | June 10, 1952 |
| 2,612,054 | Davis | Sept. 30, 1952 |
| 2,709,372 | Melone | May 31, 1955 |